| | POSITIVE PRINT | | | | NEGATIVE PRINT | | | |
|---|---|---|---|---|---|---|---|---|
| | POSITIVE PARTICLE | | NEGATIVE PARTICLE | | POSITIVE PARTICLE | | NEGATIVE PARTICLE | |
| | A | C | A | C | B | C | B | C |
| $E_C$ | + | + | − | − | S.C. | + | S.C. | − |
| $E_E$ | NONE | − | NONE | + | + | − | − | + |
FIG.30
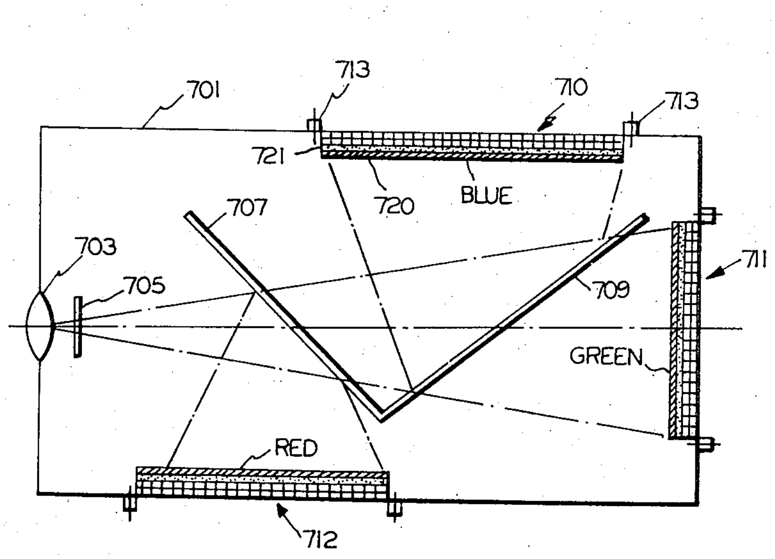
FIG.37
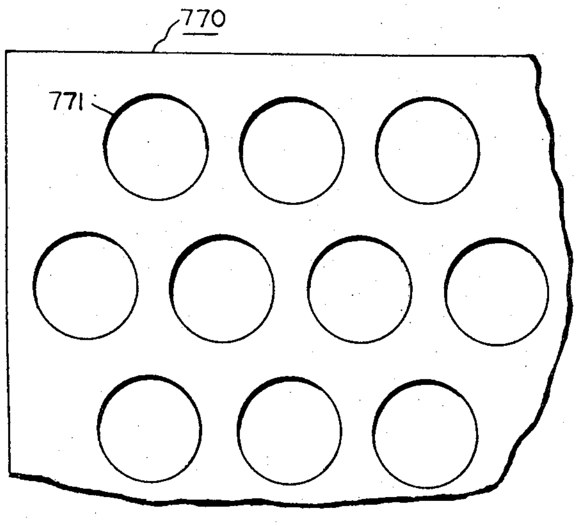
FIG.40

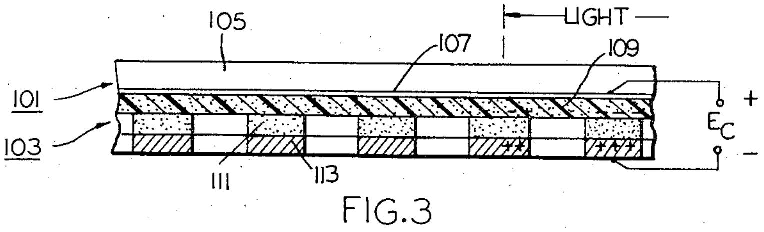
FIG.3
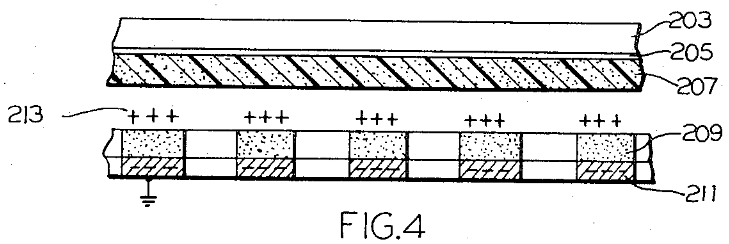
FIG.4
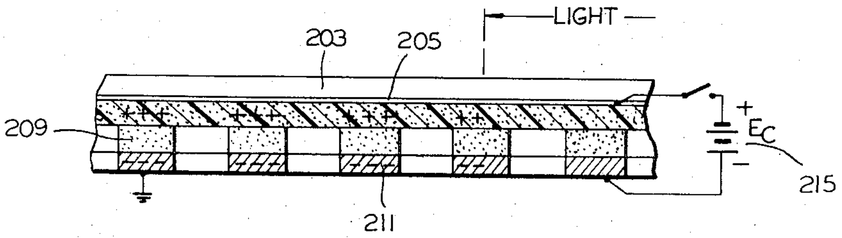
FIG.5
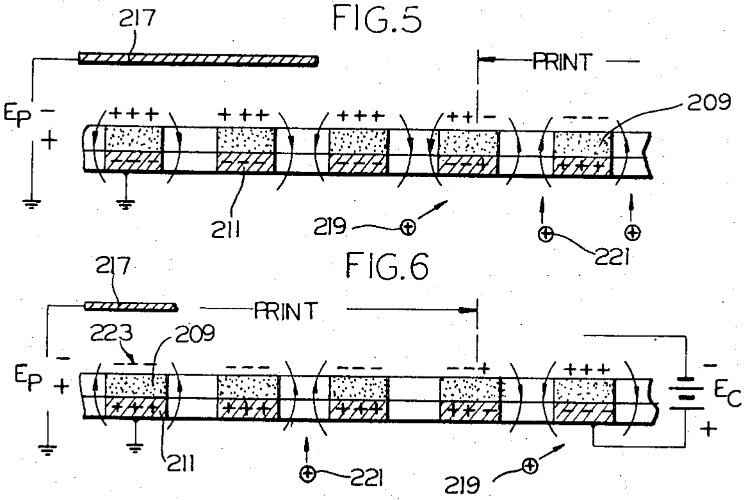
FIG.6, FIG.7
| VOLTAGE | POSITIVE PARTICLES | | NEGATIVE PARTICLES | |
|---|---|---|---|---|
| | NEG. PRINTING | POS. PRINTING | NEG. PRINTING | POS. PRINTING |
| $E_C$ | + | − | − | + |
| $E_E$ | + | − | − | + |
FIG.7a METHOD FOR APERTURE CONTROLLED ELECTROSTATIC IMAGE COLOR REPRODUCTION OR CONSTITUTION Original Filed Feb. 18, 1969

METHOD FOR APERTURE CONTROLLED ELECTROSTATIC IMAGE COLOR REPRODUCTION OR CONSTITUTION
Original Filed Feb. 18, 1969

United States Patent Office 3,809,557
Patented May 7, 1974

3,809,557

METHOD FOR APERTURE CONTROLLED ELECTROSTATIC IMAGE COLOR REPRODUCTION OR CONSTITUTION

Gerald L. Pressman, San Jose, and Thomas D. Kittredge, South San Francisco, Calif., assignors to Electroprint, Inc., Palo Alto, Calif.

Original application Feb. 18, 1969, Ser. No. 800,236, now Patent No. 3,697,164. Divided and this application July 28, 1971, Ser. No. 167,040
Int. Cl. G03g 13/22
U.S. Cl. 96—1.2 3 Claims

ABSTRACT OF THE DISCLOSURE

The invention basically comprises methods relating to the field of electrostatics, and is concerned with electrostatic reproducing or constituting in color. Apertured screen means carry charge distributions in accordance with selected color patterns, such that particles directed at the screen means pass therethrough under modulation control dictated by the pattern. The patterns may be determined by the primary or other selected colors applied in sequence, or applied simultaneously.

A multi-layered screen comprising preferably at least an insulative and a conductive layer is characterized by an array of electrostatically sensitive apertures. A propulsion field directs charged particles through the screen to a receiving medium, preferably spaced at a distance from the screen. Charge distribution on the screen controls the flow of particles through the apertures, some of the apertures being in effect blocked, partially blocked, unblocked, and enhanced, depending on the local charge level. This is true for each color or filter employed to produce the patterns of varying tone for sequential use in reconstituting the image in color, with or without contact with the substrate.

This invention describes the unique incorporation of color into various embodiments and applications depicted in our earlier filed application entitled, "Method and Apparatus for Aperture Controlled Electrostatic Image Reproduction or Constitution," filed on Nov. 15, 1968, as Ser. No. 776,146, now U.S. Pat. 3,647,291 by Gerald L. Pressman and Thomas D. Kittridge, the inventors herein and assigned to the same assignee.

This application is a divisional application of U.S. Pat. 3,697,164 issued to the same inventors on Oct. 10, 1972, and entitled Apparatus for Aperture Controlled Electrostatic Image Color Reproduction or Constitution.

This invention relates to aperture controlled electrostatic reproduction processes and methods employing one or more multi-layer screens, each consisting of an array of apertures and each preferably comprising at least a conductive layer and a superimposed insulative layer to enable the depolyment of opposite electrostatic charges on opposite surfaces of the insulative layer, thus providing a double layer of charges which produce fringing fields within the screen apertures. The screen may be precharged to produce a uniform double layer of charge, which is then modified in accordance with a selected color image to produce dimenished, zero, and reverse charged areas which enables blocking, nonblocking, and enhancing fringing fields controlling the apertures in accordance with the selected color image to be produced.

Alternatively, charged images of selected color may be established on previously uncharged screens. The conductive screen layer is maintained at a potential, usually during charging and printing for each color, and a propulsion field is provided for directing charged printing particles toward the screen. The particles will not pass or will pass in fewer numbers through apertures which lie in areas of the screen containing charges so oriented as to produce fringing fields within the apertures which oppose the propulsion field. Such apertures are termed blocked or partially blocked. The particles, however, will pass through apertures which lie in uncharged areas of the screen or which lie in areas of the screen which contain charges whose fringing fields are oriented so as to assist the passage of particles through the apertures. The latter apertures are said to contain enhancing fields, and the charged particles pass through these apertures in greater numbers.

This process thus uses a charge pattern for each color which modulates the flow of particles, such as toner, through one or a plurality of screens to a receiving medium, via preferably an air gap, for subsequent fixing thereon, if necessary.

The present invention is illustrated and described in various apparatus and methods, such as embodiments directed to office copy machines for color reproduction; color printing plates and printing methods; color cameras or color photographic arrangements; color enlargers or printing devices for slides, transparencies, negatives, or positives; a color computer or facsimile print-out arrangement; or in fact, the invention may be employed wherever multiple pattern modulated control of charged particles is inherent or desirable. It is even applicable to color television.

The color pattern or patterns to be reproduced, developed, or handled may comprise any of shapes, distributions, radiation, configurations, surfaces, or other things. While the preferred use is color reproduction of a scene using dry toner particles, nevertheless, aerosols, ink droplets, or other chargeable particles may be employed. For example, an electrostatic latent image may be configurated or reproduced. Other particles of known printing type may be employed herein.

It may be noted that the composite screen structure of the present invention employs a conductive layer, at fixed potential, for two purposes. It enables the insulative layer to be readily charged oppositely, thereby developing the fringing fields (either blocking or enhancing) within the apertures of the screen, which fields are oriented in accordance with the image pattern. It further enables the maintenance of the enhancing and blocking fields during projection of the charged colored marking materials, and the charges of the particles which do not pass through the grid or screen are rendered substantially ineffective because the conductive layer shields the fringing fields from the effects of those charges.

In certain embodiments, a single enhancing field may suffice for all color patterns; alternatively, where exposure is not simultaneous, enhancing fields will be used individually in connection with each color exposure. But in either event, in the absence of the enhancing field, the screen can only be modulated by blocking fields oriented in a single direction, i.e., from zero to minus or zero to plus volts. The addition of the enhancing field enables modulated control for the full range, i.e., minus to plus volts. Therefore, it may be noted that the enhancing field is always in the reverse direction of the blocking field, although depending upon the sign of the printing particles, the enhancing field may block, but if this is true, the blocking field enhances. This flexibility enables either positive or negative printing at the flip of a switch.

Normally, the enhancing field may be characterized as being in the same direction as the propulsion field for the particles passing through the screen to the print receiving paper or material. It may further be characterized as deploying a reverse charge in the areas heretofore discharged.

Of great importance is the fact that the enhancing field electrically enlarges the aperture beyond its physical dimensions. It may be likened to a funnel leading into the aperture from both the entrance and exit sides so that an increased amount of toner or marking material is caused to pass through an enhanced aperture. This increases the printed density and fills in the dots for solid printing in any color with densities approaching 100 percent. Thus, the addition of the enhancing field enables control from zero aperture opening to a size opening effectively beyond that of the aperture.

The modulated apertures of the screen, depicting the image area for each exposed color, are sequentially moved into or subjected to a propulsion field where charged toner particles of the selected color are projected toward the screen and pass through the screen in accordance with the modulation to continue across an air gap, due to the propulsion field, to a print receiving substrate, such as ordinary paper. Although the word paper is used primarily hereinafter, the invention is capable of printing on various materials of various configurations. Heat fixing stations fix the ink, where necessary, to provide permanent printing.

With the foregoing in mind, it is among the objects of the invention to provide an aperture controlled electrostatic color printing process and method which enables printing through a modulated screen onto ordinary paper, across an air gap.

A further object of the invention is the provision of such apparatus and methods wherein individual color controls are available to enable selection of the degree of toning in each color for producing further prints without re-exposure.

Another object of the invention is the provision of such apparatus and methods wherein multiple copies of color reproduction may be made from a single exposure.

Yet another object is the provision of apparatus and methods for incorporating the aperture controlled electrostatic color screen into color cameras and development apparatus therefor, color printing or enlarging apparatus and development processes therefor, continuous and automatic type color printers, computer print-out arrangements and the like.

The invention will be better understood from a reading of the detailed description thereof when viewed in conjunction with the drawings wherein:

FIG. 3 shows an electrostatic aperture control grid in combination with field charging apparatus to permit single color exposure without employing the enhancing field;

FIG. 4 shows apparatus similar to FIG. 3 but incorporating the enhancing field technique;

FIG. 5 shows the arrangement of FIG. 4, following exposure but prior to the application of the $E_C$ field, to represent charge distribution;

FIG. 6 shows the final charge distribution in the field charging arrangement with enhancing field for one color exposure;

FIG. 7 illustrates the final charge distribution where an enhancing field of charge opposite to FIGS. 4 through 6 was employed;

Figure 8:
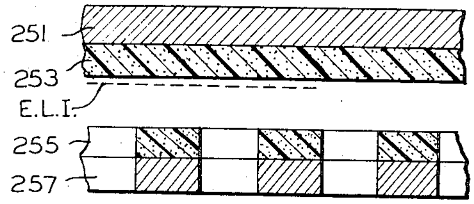
Figure 9:
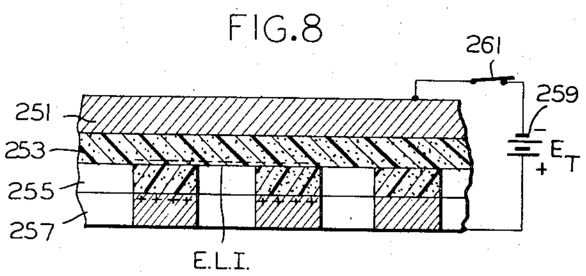
Figure 10:
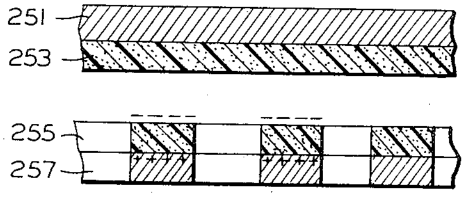
Figure 11:
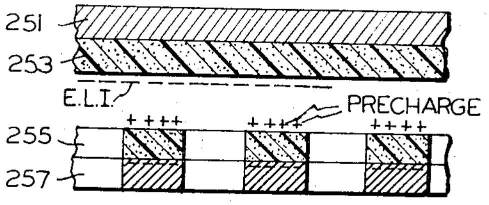
Figure 12:
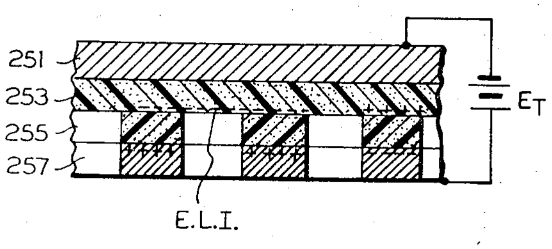
Figure 13:
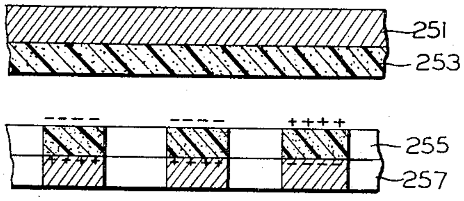
Figure 14:
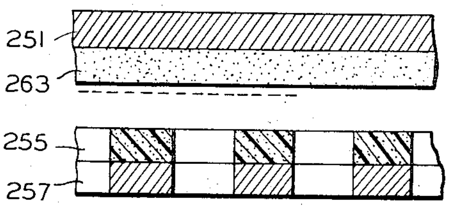
Figure 15:
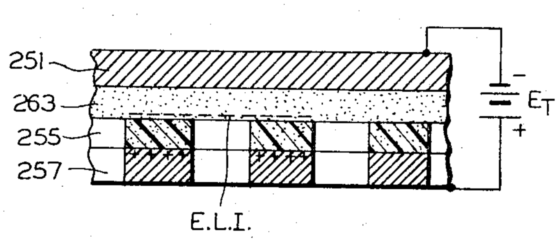
Figure 16:
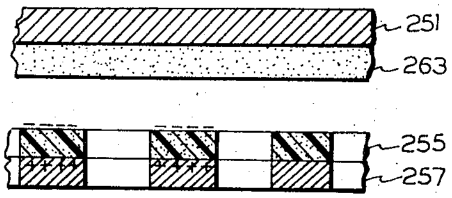
Figure 17:
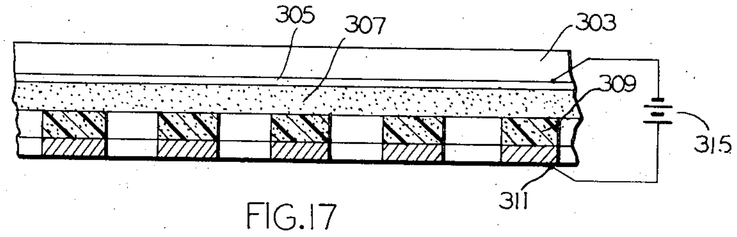
Figure 18:
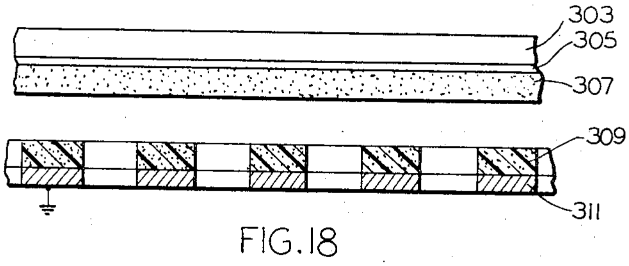
Figure 19:
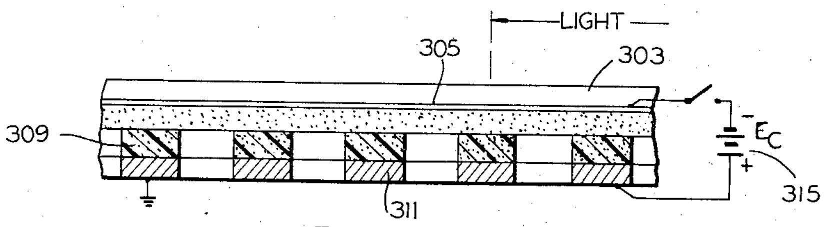
Figures 20, 21:
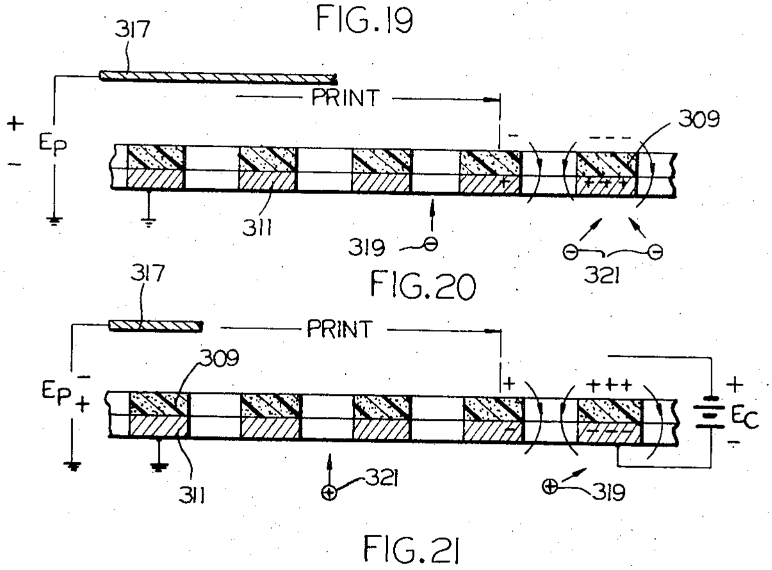
Figure 22:
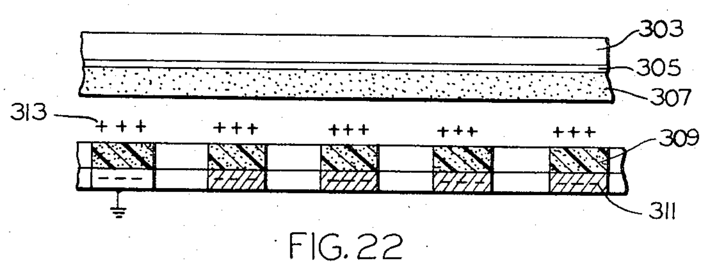
Figure 23:
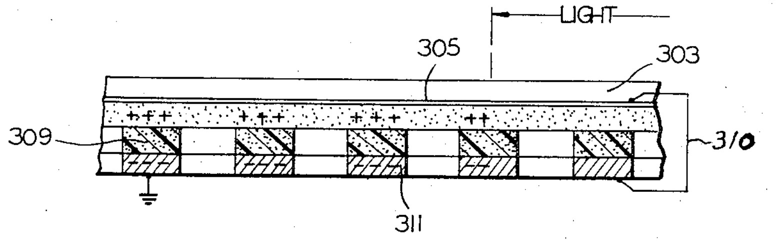
Figure 24:
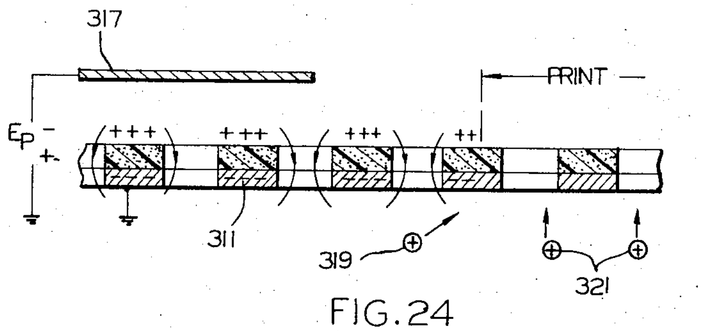
Figure 25:
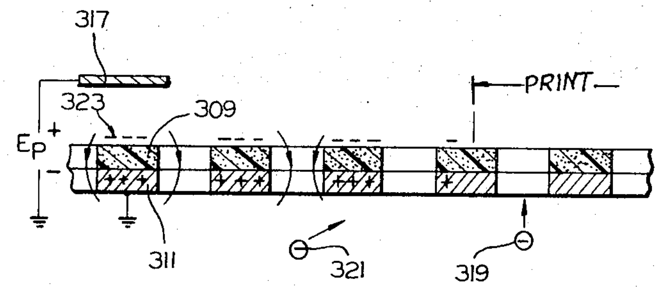
Figure 26:
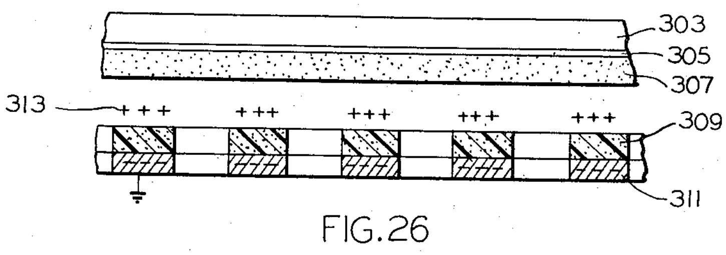
Figure 27:
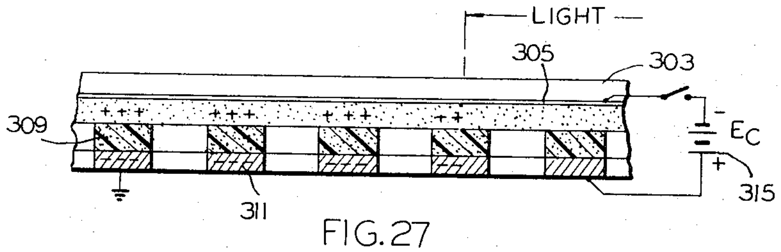
Figure 28:
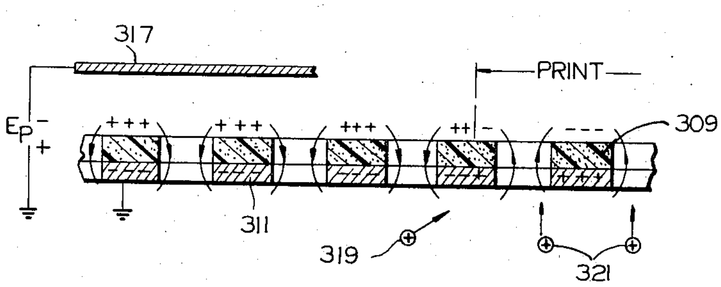
Figure 29:
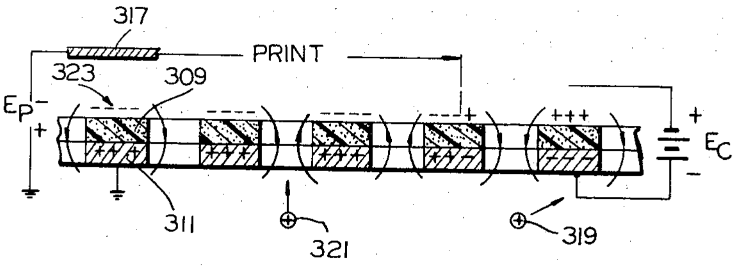
Figure 31:
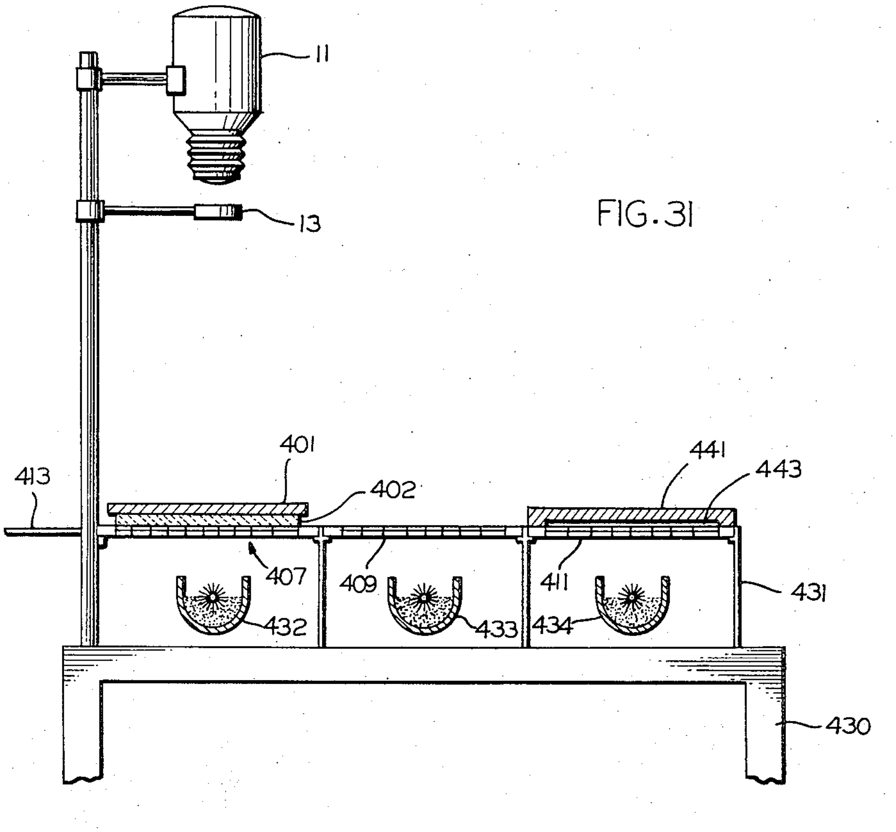
Figure 32:
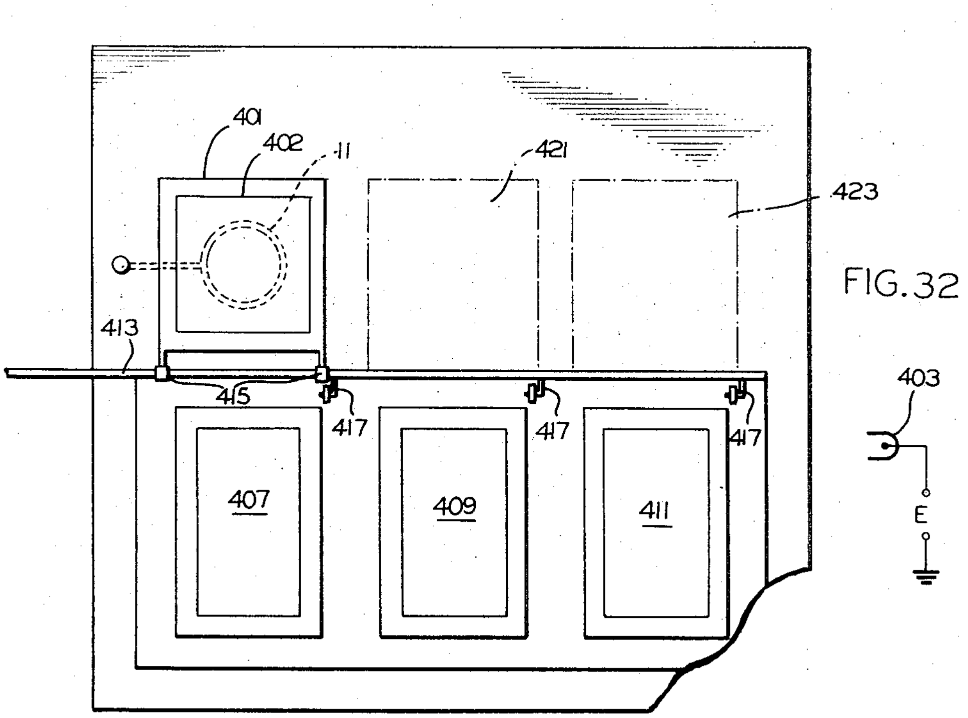
Figures 33, 34:
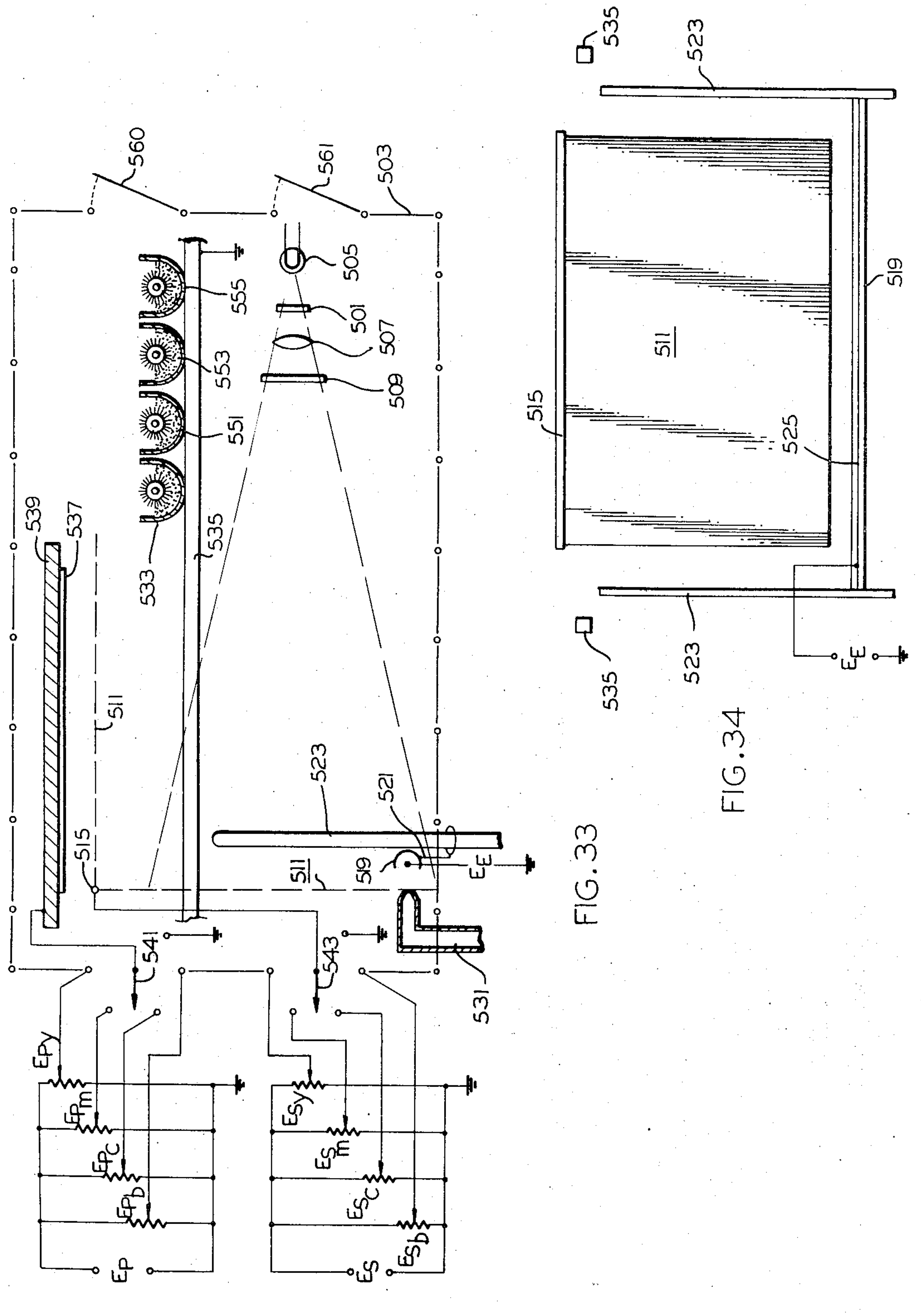
Figure 35:
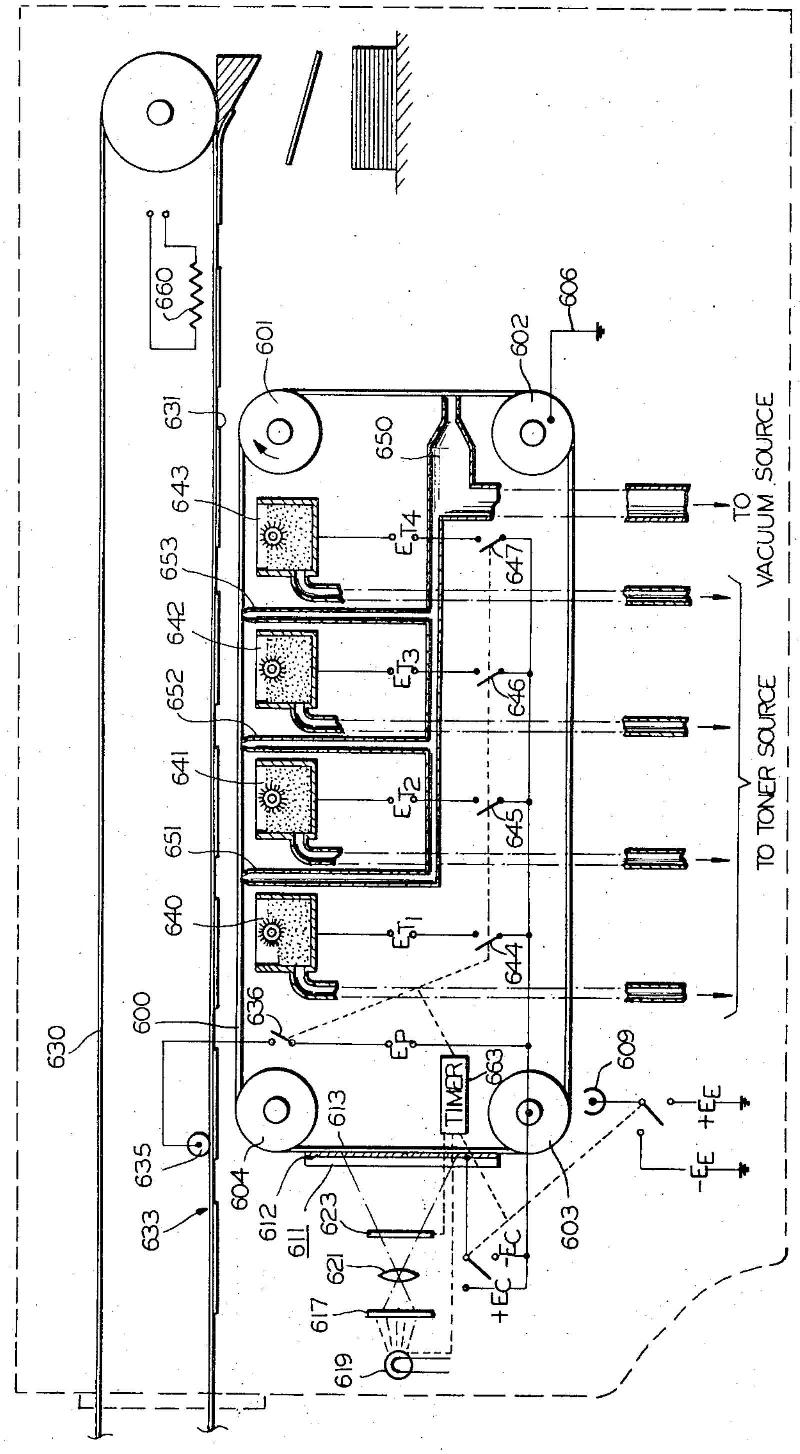
Figure 39:
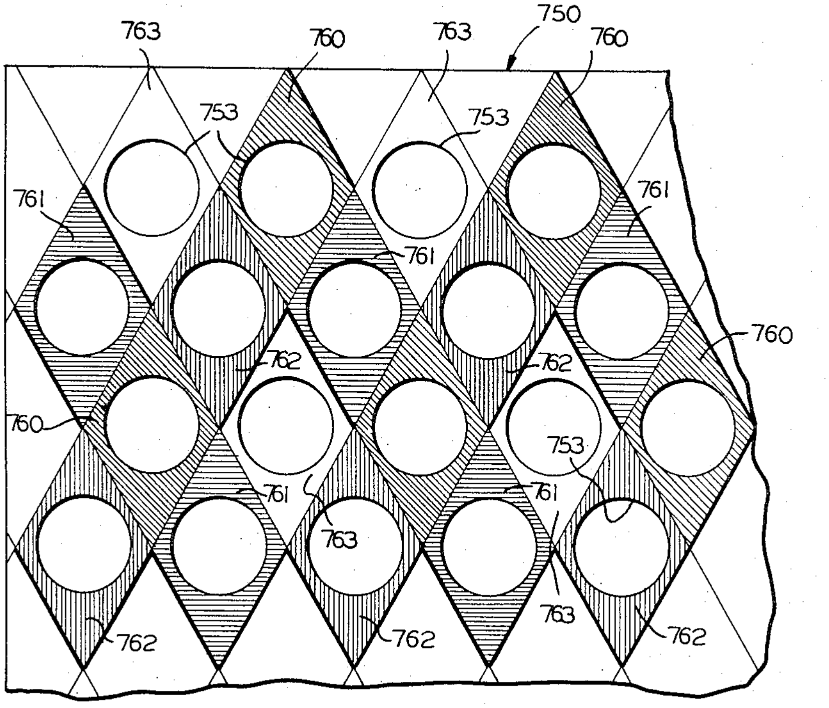
Figure 36:
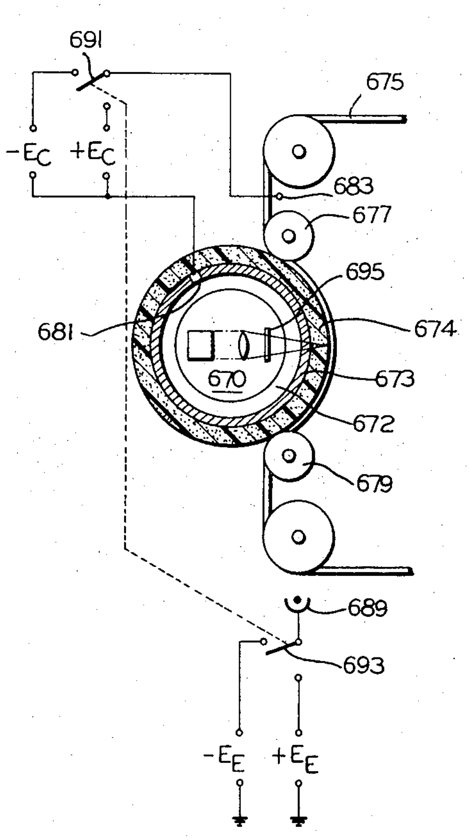
Figure 38:
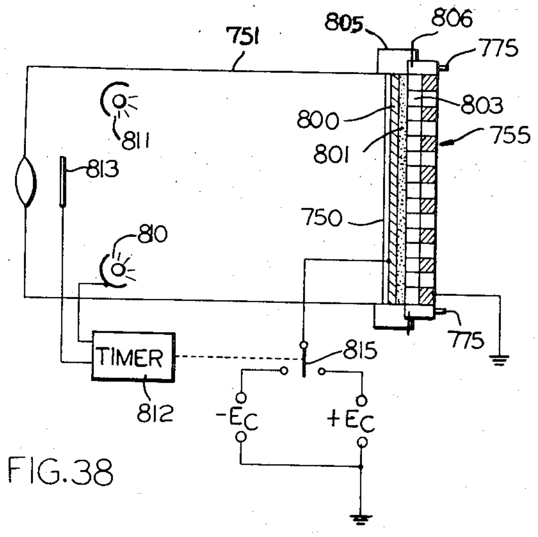
Figure 43A:
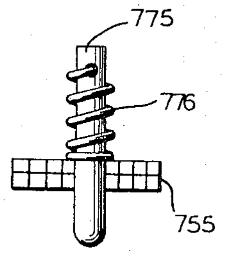
Figure 42:
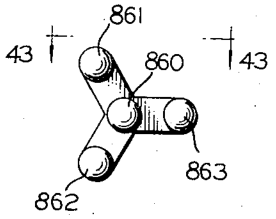
Figure 43:
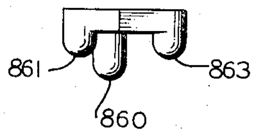
Figure 41:
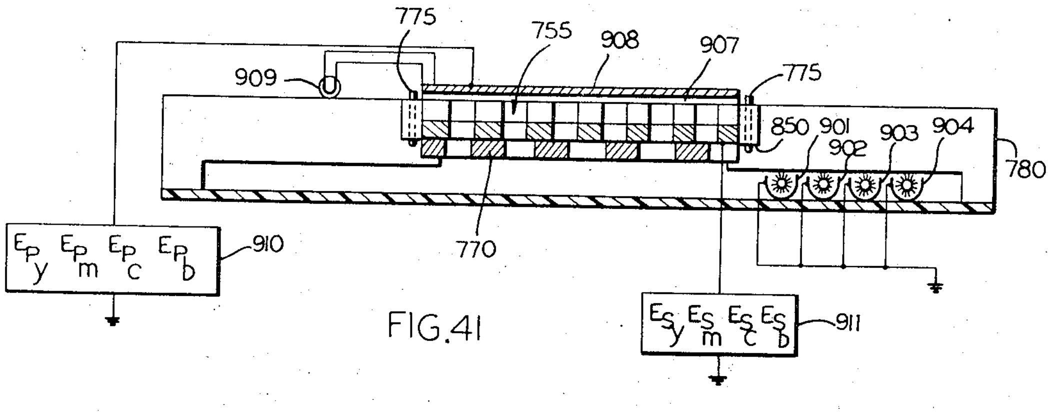

FIG. 7*a* is a chart showing polarity possibilities for printing with positive and negative particles;

FIG. 8 shows a dielectric layer with the electrostatic latent image for transfer to the double layer screen;

FIG. 9 shows the dielectric layer in proximity to or contact with the screen with an applied transfer source $E_T$;

FIG. 10 shows the dielectric separated from the screen after transfer of the electrostatic latent image;

FIGS. 11, 12, and 13 show the steps of FIGS. 8, 9, and 10, but additionally include a pre-charge on the screen of FIG. 11, so that after transfer of the electrostatic latent image, the screen of FIG. 13 is charge modulated in both forward and reverse directions;

FIG. 14 depicts a xerographic-type plate with electrostatic latent image for transfer to the screen;

FIG. 15 includes the applied transfer source $E_T$ for proximity or contact transfer;

FIG. 16 shows the screen with the transferred electrostatic latent image;

FIG. 17 shows a contact charging plate applied to an insulator-type screen;

FIG. 18 shows the contact charging plate of FIG. 17 separated from the screen prior to any charging or exposure;

FIG. 19 shows the two parts together, along with the charging potential $E_C$;

FIG. 20 shows the polarity of the charges on the screen as a result of exposure while charging source $E_C$ is connected;

FIG. 21 shows the polarity on the screen for opposite charging potential $E_C$;

FIG. 22 shows the contact charging plate prior to application to the screen but with a pre-charge on the screen;

FIG. 23 shows the two parts together with a connection therebetween to modify the pre-charge by exposure;

FIG. 24 shows printing using positive particles;

FIG. 25 illustrates printing using negative particles;

FIG. 26 shows the screen pre-charged;

FIG. 27 shows the parts together prior to application of the charging potential;

FIG. 28 illustrates the polarity for forward and reverse fields with positive particles used for printing;

FIG. 29 shows the polarity distribution when a negative pre-charge has been used;

FIG. 30 is a chart or table for potential selection relative to positive and negative printing employing particles of either sign;

FIG. 31 is a view of apparatus suitable for achieving color printing incorporating the charging methods detailed in FIGS. 14, 15 and 16;

FIG. 32 is a plan view of the apparatus of FIG. 31;

FIG. 33 shows an automatic-type color printer capable of perfect registration for producing a color print from a film negative;

FIG. 34 is an end view of the apparatus of FIG. 33;

FIG. 35 shows a color printer suitable for use as a computer print-out device for multiple copy and operable in intermittent or continuous fashion;

FIG. 36 illustrates a continuous color printer;

FIG. 37 shows one embodiment of a camera suitable for color exposures;

FIG. 38 shows a different embodiment of a color camera;

FIG. 39 shows a suitable color selection filter for the camera of FIG. 37;

FIG. 40 shows a mask suitable for developing the single multi-color exposed screen;

FIG. 41 shows a suitable development arrangement for the multiple exposure mask;

FIG. 42 shows details of the development apparatus for color registration;

FIG. 43 is a view in section of the details of FIG. 42; and

Figure 44:
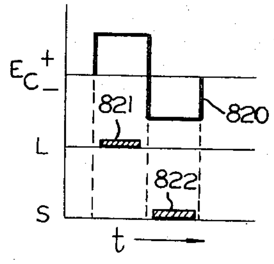

FIG. 44 is a chart showing time relationship between voltages, light pre-charging, and shutter operation for the color camera.

Figure 1:
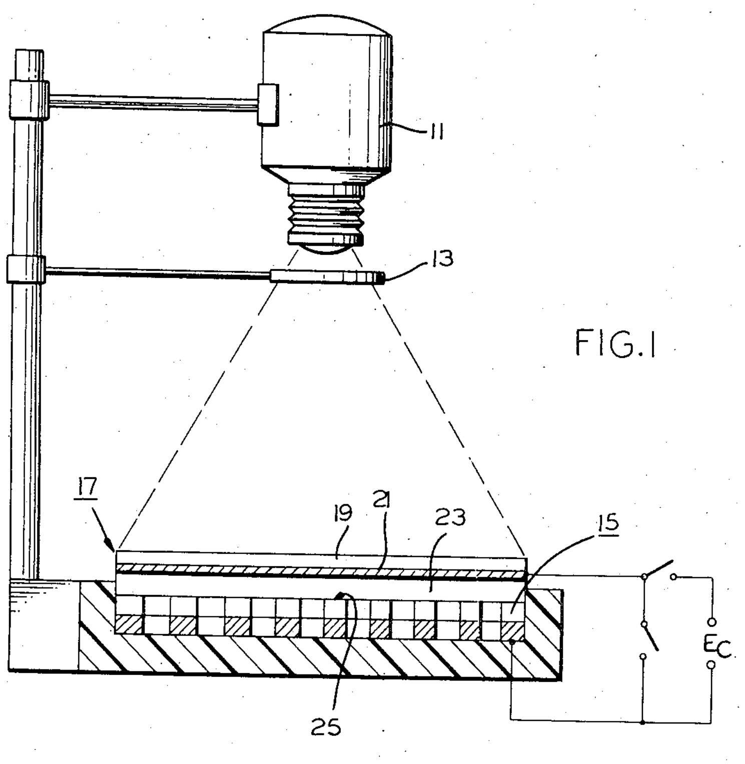
FIG. 1 shows a photographic projection printer, in combination with electrostatic color reproducing apparatus.

FIG. 1 discloses an apparatus and method for electrostatic color reproduction utilizing a conventional photographic projection printer 11, in conjunction with selectable color filters 13, with the aperture control printing screen 15. The method consists of making multiple exposures through different color filters corresponding to the primary colors, which for purposes of simplicity may be termed red, blue, and green, located at 13, it being understood that conventional sequential color printing using preselected filters is not claimed as the novelty herein. Such exposures are used to charge screen 15 with either the same screen being recharged in sequence, or separate screens each containing a charge image for each color being produced. The methods used for converting the light image into the charge image on the screen involve either field charging or contact charging, as enabled by the plate 17. With the field charging approach, plate 17 will comprise the transparent support 19, a transparent conductor layer 21, and transparent insulator 23, and the screen 15 will comprise at least a photoconductor layer 25.

For contact charging, plate 17 consists of transparent backing 19, transparent conductive layer 21, and photoconductive layer not necessarily transparent 23; and screen 15 comprises at least insulative layer 25. These methods of producing the charge image on the screen are presented in further detail hereinafter.

Figure 2:
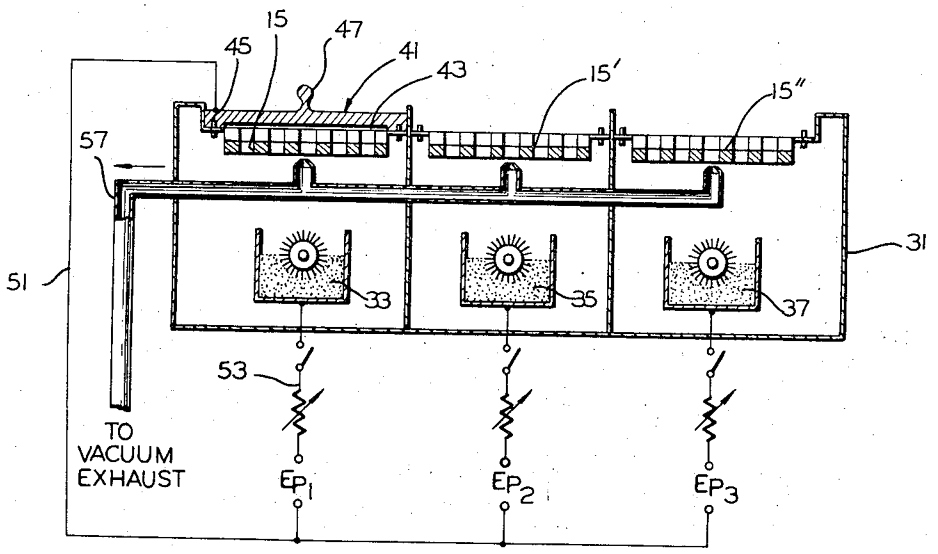
FIG. 2 is a schematic arrangement suitable for developing the color print exposed in the apparatus of FIG. 1.

After the screens have been exposed from the color slides or color negatives in projector 11, they are removed to the development stage, which may comprise the apparatus of FIG. 2. The development apparatus 31 consists of a three- or four-compartment toning device, which has provisions for containing the screen or screens 15, 15', and 15'' with a separate toning supply representing each of the primary colors in each compartment; for example, toner supply 33 may be the yellow toner, toner supply 37 may be the cyan toner, for process color printing, including supply 35 for magenta toner.

The conductive backing plate 41, which holds the paper or other material 43, to be printed, is placed by means of handle 47 over the screen and registered with the image on the screen by means of pins 45 indexing plate 41 to frame 31 in turn registering screens 15–15'. Potentials are applied to the backing plate 41, in order to provide propulsion fields for the toner particles, by leads 51 and 53 for source $E_{P1}$. The first color toner supply 33 is then activated (by revolving its rotor brush) to produce the print for the first color, after which a screen cleaning device 57 (vacuum suction) removes excess toner from the screen.

In the event a single screen 15 is used for this process, the screen 15 is then removed from the apparatus 31 of FIG. 2 and replaced in the apparatus of FIG. 1 in order to form a new image from a different color by changing filter 13. The screen 15 is then brought back to the apparatus 31 of FIG. 2, placed in position over different color toner supply 35 which contains the toner for the second color to be printed. The conductive backing plate 41 which holds the paper 43 which has already received the first color image toner is placed in position over source 35. Potential $E_{P2}$ is then applied to the backing plate, and toner source 35 is activated to produce the marking material for the second color. The process is then repeated for toner 37, as well as an additional toner, if needed for a fourth color, such as black for extreme contrast. After all of the colors have been printed, then the paper may be fixed by conventional heat fixing apparatus if necessary, or fixing may be achieved following the lay down of each color.

In the event that multiple screens are used for this process, then each of the compartments of FIG. 2 already contains a screen with charge images in place since they are put into this position immediately after their selected filter exposure is made in the apparatus of FIG. 1. Then it is only necessary, after producing the print or particle deposition in the first compartment to remove the conductive backing plate 41, which contains paper 43, and place it in position over screen 15', apply the proper potential for the propulsion field $E_{P2}$, and activate toner supply 35 to produce the second color deposition. This step is repeated for the additional toner supply 37 over which screen 15'' has been placed. Again the fixing of the image may be accomplished after all of the colors have been deposited, if required. The advantage of three screens over one screen in this process is that multiple prints can be made from one exposure, as well as adjustments made in individual colors by adjusting the potentials $E_{P1}$, $E_{P2}$, and $E_{P3}$ of the toner supply without need for re-exposing the entire sequence of images. If a re-exposure of one color is necessary, then it is only necessary to remove the screen corresponding to that color to the apparatus of FIG. 1, make a renewed exposure, and return that screen to its position in the apparatus of FIG. 2 and continue printing as many copies as required.

FIGS. 3–30 relate to methods and apparatus for charging the screen in accordance with the color patterns. Field and contact charging with and without enhancing fields is described, along with polarities of the various sources and particles for positive and negative printing.

The application of these methods and charging plates to the invention is essentially the same for all embodiments, and usually both methods with and without the enhancing field are applicable. The particular choice and advantages will be set forth hereinafter, especially with respect to single and multiple exposure embodiments.

In FIG. 3, there is depicted suitable field charging means 101 for use with the screen 103 in the absence of any enhancing field and for each color selected. Transparent support 105 of glass or even pliable material is provided for this conductor 107 and the insulator or dielectric 109. The screen 103 comprises photoconductor layer 111 and conductor layer 113. The charging voltage source $E_C$ is shown applying the double layer charge across photoconductor 111 where light reduces its resistance. Thus, field charge modulation is achieved.

FIGS. 4 through 7 show the structure used in the improved field contacting method, and illustrate the application of both a positive and a negative enhancing field.

In FIG. 4, the enhancing field is shown as the positive charges 213, uniformly covering the photoconductor 209. Screen 211 is grounded or held at a given potential level and the positive charges 213 provide the double layer charging of photoconductor 209, when in the dark, due to its resistance.

FIG. 5 shows the image elements (203, 205, 207) in contact with the photoconductor 209 of the screen. Additional provision is made for connecting the applied field $E_C$ to the conductor layer 205 of the image elements and to the conductor layer 211 of the screen. The structure of FIG. 5 is shown after light e.g. from an image (not shown) has been shined on the right hand side, as legended, but prior to application of the voltage $E_C$. Normally, for optimum charge transfer, contact would be established and then the image would be applied at the same time that the voltage $E_C$ is applied. The image would be turned off and the voltage maintained until the image elements are separated from the screen. However, in FIG. 5 it may be noted that the light simply reduces the resistance of the photoconductor 209 such that the charges in the light exposed area leak away.

In FIG. 6 the effects of the applied voltage $E_C$ are seen as a reversed field in the light or print areas. The voltage $E_C$ should be as high as possible without breaking down the photoconductor and of course be commensurate with other materials and their thicknesses. Preferably, this voltage will be about twice that of the enhancing field, in order that it may eliminate the enhancing field and apply a reverse charge to the areas where the enhancing field was eliminated. Thus, in FIG. 6 the force lines of the blocking, fringing or enhancing fields of the apertures are depicted. The positive printing material 219 is shown being deflected to the conductor 211 because the hole directly above is electrically blocked. However, particle 221 is permitted and aided to pass through the electrically unblocked and reversed aperture directly thereabove to print on the material (not shown) which would normally be adjacent to the propulsion field ($E_P$) backing member 217. Thus, for positive marking material, the enhancing field actually becomes the blocking field and the applied field becomes the enhancing field.

The opposite situation prevails in FIG. 7, wherein the negative charge level 223 was laid down as the enhancing field and it was reversed by the applied field to the right of the printing area. Thus, it may be seen that the enhancing field enables passage of marking material 221, and, of course, actually assists or aids this material in its projection toward the material to be printed. It is this aiding or assisting due to the field force lines which funnels the printing material through the enhanced openings to provide the excellent printing densities achieved. The particle 219 cannot pass through the now blocked right-hand apertures due to charges created by the applied field $E_C$.

Since the enhancing field can be either positive or negative and since the applied and propulsion fields may be reversed, positive or negative printing can be obtained using either positively or negatively charged printing material. Thus, in FIG. 6 positive printing would be obtained if $E_P$ were reversed and negatively charged printing material used, the enhancing and applied fields remaining, as shown.

Other methods of charge image transfer may be employed with or without the enhancing field. For example, the insulation or dielectric layer 207 may be used per se, to carry a charge in accordance with the image. One such charge pattern would be an electrostatic latent image. Without the enhancing field, the electrostatic latent image charge would simply be transferred to an insulator in the position of element 209. To incorporate the enhancing field, the insulator 209 could be precharged with the enhancing field level and the electrostatic latent image would then overcome and reverse the precharge in the image areas to operate in the same manner as depicted in FIGS. 6 and 7.

In FIG. 7*a* there is shown a polarity chart to indicate the proper polarity for the voltage $E_C$ and voltage $E_E$ for printing with positive particles and for printing with negative particles, it being understood that these voltages are switched together in accordance with the chart. The chart may be considered against FIGS. 4 through 7, it being apparent that in FIG. 4 the charge 213 corresponds to voltage $E_E$. Thus, referring to the chart, when both voltages $E_C$ and $E_E$ are positive, negative printing is produced when using positive particles and positive printing is produced when using negative particles. When the polarity of voltages $E_C$ and $E_E$ is negative, then positive printing is produced by using positive particles and negative printing is produced by using negative particles.

FIGS. 8 through 16 illustrate arrangements for establishing charge patterns directly on the screen means with and without enhancing fields, and using either a dielectric or insulative layer, as well as a photoconductor layer.

In FIG. 8 an electrostatic latent image is shown in the form of the negative charges carried by a dielectric or insulator layer 253 backed by a conductive layer 251. It is desired to charge the screen comprising the insulator layer 255 and the conductor layer 257 to the charge pattern corresponding to the electrostatic latent image.

In FIG. 9 the charge-carrying elements are brought together with the screen either in proximity or contact such that the electrostatic latent image is transferred to double-charge the insulator layer 255 of the screen by closure of switch 261 to apply voltage from transfer source $E_T$ shown at 259.

In FIG. 10 the elements are shown apart with insulator layer 255 of the screen being charged in acordance with the electrostatic latent image.

In FIGS. 11 through 13, the same type charging is carried out except that a precharge has been applied to the insulator layer 255 of the screen to take advantage of the enhancing field approach previously described. From FIG. 13 it will be seen that the transfer charges of the electrostatic latent image overcome and reverse the precharge in the areas of the electrostatic latent image, whereas the precharge remains undisturbed in the other areas.

In FIGS. 14 through 16 a conventional xerographic plate is shown comprising photoconductive layer 263 and conductive backing layer 251. The electrostatic latent image is transferred in FIG. 15 by application of transfer source $E_T$ to produce the charged screen of FIG. 16. It will be appreciated, of course, that the enhancing field approach is equally applicable to the xerographic plate, from a review of the description of FIGS. 11 through 13.

FIG. 17 shows the apparatus and its arrangement for putting electrostatic charge images on the insulator coated screen by contact charging. The contact charging plate consists of a transparent support 303 which carries a transparent conductive coating 305 and a photoconductive coating 307. During the charging operation, this contact charging plate is placed in direct contact with the screen which consists of an insulator layer 309 and a conductive backing 311. A charging voltage 315 is applied between the transparent conductive coating 305 of the contact charging plate and conductive backing 311 of the screen.

FIG. 18 shows the contact charging plate and the screen just prior to contact. At this point, the screen insulator layer 309 is uncharged.

In FIG. 19 the contact charging plate is placed in direct contact with the insulator layer of the screen and the charging voltage $E_C$ (shown at 315) is applied between the conductive coating 305 of the charging plate and conductive backing 311 of the screen. A light image is then projected through the transparent support 303 and transparent conductor 305, exposing the photoconductive layer which becomes conductive in those areas struck by light. This permits charge to accumulate at the interface between the conductive layer 309 of the screen and the surface of the charging plate. These charges accumulate only in those areas illuminated by the image in amounts proportional to the intensity of the illumination. The contact charging plate is then removed from the surface of the screen and the accumulated charges remain as shown in FIG. 20.

The polarity of charge shown in FIG. 20 will produce blocking fields for negative particles 321 which will not pass through the highly illuminated areas but particles 319 will pass through the dark areas of the image, thus producing direct positive printing. Alternatively, as shown in FIG. 21, positive particles 319 may be blocked by reversing the charge potential $E_C$, thereby applying positive charges on the surface of the screen in the illuminated areas. Positive particles 321 pass through the unilluminated areas to print.

In FIG. 22, the screen is shown as being precharged with charge levels indicated at 313. The contact charging plate is then placed in contact with the screen as shown in FIG. 23. The light image is projected through the transparent support 303 and transparent conductor plate 305. During this exposure, the conductive backing 305 of the contact charging plate is connected by means of connection or short 310 to the conductive backing 311 of the screen. The illuminated portions of the image falling on the photoconductor 307 cause discharge of the previously charged areas of the screen in the illuminated areas. The photoconductive plate is then removed from the surface of the screen and the charges which remain on the screen correspond to the dark areas of the original image.

In FIG. 24 there is shown how these charges block particles 319 of positive sign. But the particles 321 will pass through the holes corresponding to the illuminated areas of the image, thus producing a negative print. Propulsion field $E_P$ encompasses the screen and usually the print receiving medium would be disposed in the space between the screen and boundary plate 317.

In FIG. 25 it is shown that with a reversed polarity of the precharge 313, i.e., negative precharge 323, negative particles may also be used in the same manner.

In FIG. 26, the screen is again shown with the precharge 313 prior to contact with the contact charging plate.

In FIG. 27 the contact charging plate is placed in contact with the insulator layer 309 of the screen and a light image is projected through the transparent portions of the contact plate to photoconductor 307. A charging potential $E_C$ is applied between the conductive coating 305 of the charging plate and conductive backing 311 of the screen. In those areas of light image which illuminate the photoconductor, the charging voltage $E_C$ reverses the applied precharge by causing an accumulation of charges in the interface between the photoconductive layer and insulator layer. The contact charging plate is then removed from the surface of the screen, allowing both the original precharge (which remains in the unilluminated portions of the image) and the accumulated charge which appears on the illuminated portion of the image, to remain on the surface of the screen.

Thus, looking at FIG. 28, there is shown the polarity of charges which will produce negative printing with positive particles. Particles 321 will pass in the illuminated areas and their passage is enhanced by the forward fields in this region. By the same token, particles such as 319 will pass through the screen because of the reverse fields which provide even further control over the concept using fields from only zero to plus or zero to minus.

In FIG. 29 the polarity of the precharge 323 is shown reversed as well as the polarity of the charging potential $E_C$. Therefore, for positive particles, such as 321, positive printing is permitted because they pass through areas corresponding to the dark portions of the image.

There has been found that in employing the contact charging plate, some pressure between the screen and the contact plate is desirable. Also by way of example, the precharge potential may be of the order of 100 to 300 volts and the charging potential $E_C$ in the order of 700 to 1000 volts which produces on the screen surface potential upward from 100 to 300 volts of opposite polarity of that of the precharged potentials. It is not necessary that maximum forward and the maximum reverse fields be of equivalent magnitude. In partially illuminated areas, fields will vary in intensity between maximum forward and maximum reverse levels. The advantages of contact charging are that the charging image is produced on an insulated surface which can be of very high quality, and which is generally easier to apply to screens than photoconductive coatings, and which also can support the charge image for long periods of time extending into many hours; and it is compatible with both image charging as well as modification of precharge; and the ability by selection of potential polarity to produce either direct positive or negative reproduction of the image as demonstrated in FIG. 30.

In FIG. 30 method A refers to direct image charging without precharge. Method B refers to the use of precharge only with a direct connection between charging plate and screen during exposure, thus producing modification of precharge. Method C refers to the combination of both a precharge and a charging voltage to provide enhancing field capability. In FIG. 30, $E_C$ refers to the polarity the charging potential while $E_E$ refers to the polarity of the precharge on the screen. From the table, it may be seen that either positive or negative printing may be achieved depending on the polarity selected for $E_E$ and $E_C$.

An apparatus for producing color reproductions from color slide transparencies or negatives, utilizing the xerographic charging and charge transfer methods detailed in FIGS. 14, 15, and 16 is shown in FIGS. 31 and 32. Here, the projection printer 11 projects the image through color filters 13 onto a xerographic plate, consisting of conductive backing 401 and photoconductive coating 402. This xerographic plate has been precharged by means of corona source 403 to uniform charge level. This source may conveniently be a portable hand-operated source.

Exposure of the photoconductive surface 402 of the xerographic plate is made when the plate is hinged back to be placed directly at the projection point of the printer 11. The xerographic electrostatic latent image, thus formed, is then transferred to screen 407, which consists of at least an insulative layer, by hinging the xerographic plate forward until the photoconductive layer 402 is in direct contact with the screen insulative layer of screen 407. The image is then transferred to the screen surface, as indicated in the FIGS. 14, 15, and 16.

The xerographic plate is slidably mounted on rod 413 by means of bearings 415 for movement into the position for charge transfer and for printing, located by register pins 417. For subsequent exposures of different colors and transfer to screens 409 and 411, the xerographic plate is charged and exposed in the manner previously described and then slid on rod 413 into position 421 to transfer to screen 409, and after the third exposure into position 423 for transfer of this color image to screen 411, as depicted in FIG. 31.

The table 430 on which is mounted the enlarger 11 also supports the toner apparatus 431 which contains three or four compartments, one for each color of toner to be printed.

Apparatus 431 also contains provision for hinge mounting of conductive backing plate 441 which holds paper 443. The conductive backing 441 and paper 443 may comprise an arrangement identical to or similar to that of the xerographic plate comprising elements 401 and 402. It is only necessary to slide the xerographic plate off the rod 413 and place the paper holder 441 slidably upon rod 413 in order that the paper may be successively exposed to toner through screens 407, 409, and 411 with the same indexing pins 417 employed for registration.

The conductive plate 441 holding paper 443 is placed in position over each screen sequentially and toning is done, as described, in conjunction with FIG. 2, using the same electrical propulsion or development fields.

In FIGS. 33 and 34, there is shown an automatic type color printer employing a non-slidable hinged screen for perfect registration and xerographic charging for reproducing in color from a film negative. The negative 501 is shown in light-tight housing 503 positioned between light source 505 and optical arrangement 507. The selectable color wheel or filter 509 is interposed in the light path to screen 511, which is preferably of the double layer type having a photosensitive layer and a conductive backing layer. The screen is hinged at 515 and is shown in both its horizontal and vertically downward positions, the latter position being used for charging with precharge from corona source 519, powered by precharge voltage $E_E$ and carried on an extension 521, adapted to ride up rod 523.

As best seen in FIG. 34, corona source 519 includes a corona wire 525 adapted to span and traverse the entire screen 511.

Initially screen 511 is lowered to its downward position and the vacuum cleaner 531 traverses its surafce to clean up toner particles. Then, the precharge corona charge 519 is caused to traverse the screen, thereby charging it, followed by exposure through a first of the color filters 509. The screen 511 is then returned automatically, or manually, to its upper position, and the appropriate toner supply, such as toner supply $T_y$, shown at 533, is activated to supply yellow toner. The toner supplies are carried by a pair of racks or rails 535 and they may comprise elongated troughs for passing close to, but underneath of, screen 511 to tone the paper 537, carried by conductive backing 539 via screen 511. At this time, the propulsion field switch 541 is placed on the upper terminal to apply propulsion field $E_{P_y}$ which potential is adjustable by the tap shown. Similarly, contact arm 543 is placed in its upper position to apply an adjustable potential $E_{S_y}$ to the screen. By adjusting either or both of these potentials, the degree of toning for the individual toners may be controlled.

The foregoing process is then repeated for two or three more colors, such as magenta, supplied by toner source 551, cyan supplied by toner source 535, and if desirable, black supplied by toner source 555.

The rails 535 are sufficiently long as to prevent the toner sources, which have been used, to remain beyond the screen region after they have been employed. Following complete printing, they are returned to the position shown in FIG. 33 for repeated operations, if one or more are selected for repeat operation, in the same cycle, to provide a different toning upon re-exposure for that color.

The housing 503 includes access doors 560 and 561 for supplying toner and locating the image and manually adjusting the color wheel, unless it is automatic.

While this color printer has been shown employing xerographic charging, it will be understood that contact or field charging may be employed to produce positive or negative printing, as is also the case with the enhancing field technique.

In FIG. 35, there is shown a color printer which may comprise an office copy machine, a computer print-out device, or other type printer capable of positive or negative printing, using either positive or negative printing particles, and being compatible with contact or field charging or xerographic charging.

The color printer of FIG. 35 is illustrated as employing field charging and may comprise an intermittent or continuously movable conveyor 600 mounted for endless movement on the rollers 601, 602, 603, and 604. The conveyor 600, in the application illustrated, comprises the double layer screen with the photoconductor layer facing outwardly and the conductive backing being grounded or otherwise at a potential level, herein illustrated as ground 606. Corona source 609 is optional, being provided for positive or negative precharging from sources $E_E$, to incorporate the enhancing field techniques.

The field charging plate includes transparent backing member 611, transparent conductor 612, and transparent dielectric 613. This field charging plate 611 is held in light or easy contact with screen 600.

The transparency 617, to be reproduced, is placed in front of light source 619, and an optical arrangement 621 projects light through the selected appropriate color filter 623 onto the photoconductive layer of screen 600. The charging voltage, either $+E_C$ or $-E_C$, is applied to the transparent conductive backing member 612 as previously detailed. The simplest approach is to sequentially flash the image, in the selected three or four colors, under control of the filters 623. However, it will be apparent that a scanner mechanism could replace the optical arrangement, and the image scanned continuously in the sequential colors, provided synchronization is established between conveyor 600 and conveyor 630 which carries the paper or medium 631. Conveyor 630 comprises conductive backing 633, such that a contact slider or roller 635 may be connected by way of switch 636 to the propulsion source of voltage $E_P$ for the toning operation.

There are illustrated four separate toning sources 640 through 643 which may contain dried powder of the colors, yellow magenta, cyan, and black, or other highlighting color.

Each of the toner supply sources has its own toner potential, represented as $E_{T1}$, $E_{T2}$, $E_{T3}$, and $E_{T4}$, each of which may be individually adjustable to control the degree of toning for the individual colors. Also, each is activated individually by the switches 644 through 647.

It is desirable to clean the screen 600 between toning stations and, accordingly, the vacuum exhaust system 650 is provided with the upright cleaning conduits 651, 652, and 653.

It should be noted that, using dry toning material (which is not the only type printing material which can be employed), only a single fixing station 660 is required to fix all colors at once. Aerosol or other toning arrangements, of course, may be substituted for the dry powdering sources shown.

The operation of the apparatus of FIG. 35 is sequential, and is all under control of timer 663. The timer may be set to select either positive or negative precharging voltage, minus $E_E$ or plus $E_E$ or either positive or negative charging voltages $E_C$. As depicted in detail earlier, the polarities of $E_C$ or $E_E$ are reversed for contact charging relative to field charging. The timer 663 also synchronizes the light source 619 with the proper filter 623 for flashing screen 600, and closes the propulsion field sequentially for the various toning sources, as well as activates the sources over the switches 644 through 647.

If the apparatus of FIG. 35 is employed as a multiple copy computer print-out in color, it is only necessary to extend conveyor 600 to accommodate two or more sets of the toning sources shown, with individual vertical conveyors having horizontal reaches replacing conveyor 630, with one such conveyor for each set of toning sources to provide the multiple copies.

In FIG. 36, there is shown a continuous color printer having an optical scanner 670 within a field charging plate, shown generally in the form of a drum. The drum comprises a glass supporting cylinder 672, backed by a conductive cylinder 673, which is transparent and an insulating cylinder 674, also transparent. The conveyor 675 comprises an outside photoconductive layer, which is pressed into contact with the drum by the adjacent rollers 677 and 679.

Either positive or negative charging fields ($E_C$) may be applied by establishing a connection at slider 681 with transparent conductor 673, and a connection at roller 683 to the conductive backing of screen 675.

The precharge is obtained from corona source 689, powered by either positive or negative precharging source $E_E$. The selector switches 691 and 693 are ganged together so that either positive or negative printing, using either positive or negative particles, may be accomplished.

The filter or color filter wheel 695 is interposed in the optics 670 for selection of the proper filtering for the sequential exposures, but in this case, the exposures may be in line by line fashion.

To employ contact charging in the apparatus of FIG. 36, it is only necessary to substitute a photoconductor for member 674 and also use an insulator layer for screen 675. Then, of course, one of $E_C$ or $E_E$ is reversed in polarity, as heretofore explained in detail.

In FIG. 37 there is shown a reproducing embodiment incorporating a plurality of screens into a novel camera for the reproduction in color of illuminated scenes; and, in FIGS. 38 through 44, a different type camera is disclosed, along with a detailed consideration of various voltage, and timing or synchronizing requirements.

In FIG. 37, the camera comprises a light-tight box 701, with conventional lens 703 and shutter 705. A pair of dichromatic mirrors 707 and 709 is arranged to direct the image onto three or more screens 710, 711, and 712, which are removably affixed to box 701, by the indexing pins 713.

Permanently affixed within the box 701 at the locations of the screens are transparent conductors 720, and photoconductors 721. The three screens are simultaneously exposed by opening shutter 705 with, for example, screen 710 receiving a blue image, screen 711 a green image, and screen 712 a red image. The screens may then be removed from the camera, and developed in the apparatus of either FIGS. 2 or 31.

In the embodiment illustrated in FIG. 37, the screens may be of the insulative type, and therefore, light insensitive, such that development can be accomplished at any time up to several hours after exposure.

The camera of FIG. 37 may also incorporate enhancing field techniques, following the teaching of the description of the modification of FIGS. 38 through 44 wherein a modified camera is disclosed, which makes use of the color selection filter 750, pictured within camera box 751, and shown in detail in FIG. 39. The color selection filter comprises a pattern of filtering regions for the selected or primary colors, printed or laid down on a glass or other transparent substrate. The apertures 753 of screen 755 are visible through the substrate 750. In the pattern of FIG. 39, the regions 760 may for example pass only a green light image, whereas the regions 761 transmit the blue image and the regions 762 the red image. It may further be seen that the regions 763 do not contain any filtering material, such that all light may pass through these areas.

For developing the single multicolor exposed screen 755, a mask 770, shown in FIGS. 40 and 41, is employed to avoid color contamination. The mask comprises an array or pattern of apertures 771 of which the apertures are larger than the screen apertures 753, but smaller than the filtering regions 760, 761, and 762 or the non-filtering regions 763. The purpose of mask 770 is selectively to distribute the proper toner particles to the correspondingly colored regions, while masking all other regions. Therefore, there must be relative movement established between the screen 755 and the mask 770, between each toning step. However, since the color selection filter 750 is fixed within camera 751, and screen 755 related thereto by indexing pins 775 (FIG. 38), then the mask 770 may be fixed in the developing apparatus 780, and the screen 755 related thereto by the same indexing pins 775.

The camera of FIG. 38, is illustrated using a contact charging plate technique, with the plate comprising transparent conductive electrode 800 and photoconductive layer 801, which is adapted to be contacted by the insulator layer 803 of screen 755, and held firmly thereagainst, through the provision of the locking or retaining arms 805 and detent pins 806.

The camera of FIG. 38 is useful, with or without the enhancing field, and by showing both positive and negative $E_C$ sources, along with the connected lights 810 and 811, the enhancing field charge levels may be incorporated. A conventional timer 812 is used to synchronize the operation of shutter 813, lights 810 and 811 with the selection of the proper charging potential $E_C$, over switch 815. The light flooding produced by the internal lights 810 and 811, during application of, for example, positive $E_C$ produces the uniform precharge for the enhancing field. The exposure during the negative cycle of $E_C$, as shown at 820 in FIG. 44, modifies (diminishes and even reverses) the precharge in the illuminated areas of the image, producing the required charge distribution for the enhancing and blocking field actions.

In FIG. 44 the preferred timing sequence is shown as, first applying $E_C$, then turning on lights 810 and 811 for the period corresponding to the time interval 821, then reversing $E_C$, and then opening the shutter for the time interval 822.

Now the screen 755 may be removed from the camera 751 and placed in the developing apparatus 780. This must be accomplished much more rapidly when field charging is employed than in the case shown, where contact charging is used.

In FIG. 41, the screen 755 is located over mask 770, with the pins 775 being used to select one of the four positions for toning. FIGS. 42 and 43 depict this orientation. Pin 775 is urged downwardly by spring 776, through screen 755. At this point it must be pointed out that the movement to be effected for accurate registration is only a few mils; and, therefore, the machining must be intricate. Flat surfaces 850 are provided in the development apparatus 780, and each includes slots or grooves, in the configuration of FIG. 42 to accommodate the pins 755 in one of four different positions. The center hole 860 in surface 850 (best seen in FIGS. 41 and 43) is deeper than the locating hole 861 for the red color, or the locating hole 862 for the blue color, or hole 863 for the green color. In this manner, it is somewhat easier to determine the relative location of the apertures in screen 755 relative to the apertures 771 of mask 770.

Of course, a predetermined sequence is followed in aligning the screen 755 with the mask 770, to correspond to the toner sources. The toner sources 901 through 904 may comprise, for example, yellow, magenta, cyan, and black pigment for developing the charge image of screen 755. Each toner source is, preferably, an elongated trough adapted to scan the mask 770 from right to left, in sequence, with developing apparatus 780 including sufficient space to the left for collecting the toner sources after they have been used, and then returning any or all for subsequent repowdering, at, for example, a different potential.

The paper or other receiving medium 907 is carried by conductive backing plate 908, which hinges at 909, to the apparatus 780. Individual propulsion fields or sources, therefore, are shown in the box 910 for individual control of the propulsion field, during toning in each color. Similarly, the screen potential is under control of the individual sources, in box 911.

It may now be seen that the techniques explained in connection with FIGS. 3 through 29 may be employed with the apparatus of any of FIGS. 1, 2, 31, 32, 33, 34, 35, 36, 37, or 38. However, no particular advantage is seen, at the present time, in applying the xerograph charging technique to the camera embodiments.

It will be noted that in the camera embodiments the circuitry, timer, and precharging lights of FIG. 38 may all be incorporated into the three screen camera of FIG. 37. Additionally, of course, flaps or covers (not shown) enclose the reverse sides of the screens in order to maintain the light-type camera housing, the flaps may be provided with the camera housing or as cases for the screens.

What is claimed is:

1. The method of sequentially developing a multicolor image from multicolor optical exposure produced electrostatic charge patterns carried by an apertured insulative layer of a double-layer screen including an apertured conductive layer affixed to the insulation layer and wherein each color electrostatic charge pattern is carried by a different predetermined set of apertures interpersed within the image, comprising the steps of:

establishing a particle projection field from a source of charged toner marking particles of one of said multicolors to a print receiving medium;

masking the screen to leave uncovered only that set of apertures carrying electrostatic charge patterns produced by optical exposure to said one color;

deploying the so-masked screen in said field;

adjusting the magnitude of said field relative to the fixed magnitude of the electrostatic charge patterns to control the toning of the print receiving medium image in said one color by toner particles passing through the unmasked apertures in accordane with the electrostatic charge patterns manifested at said unmasked apertures;

shifting the relative position of the mask and screen to uncover only the set of apertures carrying electrostatic charge patterns produced by optical exposure to another of said multicolors;

establishing a particle projection field from a source of charged toner marking particles of said another color;

repeating the deploying and adjusting steps for said another color particles; and repeating the last mentioned shifting, establishing, and repeating steps for each of said multicolor optical exposure patterns.

2. The method of color photography using a screen having an aperture insulating layer overlaying an apertured conductive layer comprising the steps of:

disposing a conductive transparent plate and photoconductive plate against the screen; dividing the screen into a plurality of different interleaved color separating patterns;

exposing the screen via the separating patterns and plates while applying a potential between the conductive plate and the conductive layer; and developing the scene onto a print receiving medium by sequential projection of charged marking particles from sources respectively corresponding to the colors of the separation patterns via the exposed screen, while sequentially masking the screen as divided for the respective colors.

3. The method of claim 2 comprising the further step of:

flooding the screen with light while applying a potential opposite to said potential between the conductive plate and the conductive layer prior to said exposing step.

References Cited

UNITED STATES PATENTS 3,226,307 12/1965 Tokumoto ........ 96—1.2 X
3,329,590 7/1967 Renfrew ........ 96—1.2 X 3,322,538 5/1967 Redington ........ 96—1.1
3,121,375 2/1964 Fotland et al. ........ 96—1.2 X
2,939,787 6/1960 Giaimo ........ 96—1 R
3,625,604 12/1971 Pressman ........ 96—1 R
3,582,206 6/1971 Burdige ........ 355—16
3,532,422 10/1970 McFarlane ........ 355—4
3,680,954 8/1972 Frank ........ 355—3
2,986,466 5/1961 Kaprelian ........ 96—1.2
3,458,310 7/1969 Arneth et al. ........ 96—1.2
2,937,943 5/1960 Walkup ........ 96—1 R
3,147,679 9/1964 Schaffert ........ 96—1 R
3,545,969 12/1970 Herrick et al. ........ 96—1 R
2,825,814 3/1958 Walkup ........ 96—1 R CHARLES E. VAN HORN, Primary Examiner U.S. Cl. X.R.

355—4